(12) United States Patent
Lee et al.

(10) Patent No.: US 9,944,385 B2
(45) Date of Patent: Apr. 17, 2018

(54) DUAL LOCKING HYDRAULIC ACTUATOR FOR STRUCTURAL BRACE

(71) Applicant: SPP Canada Aircraft, Inc., Mississauga (CA)

(72) Inventors: V-Bond Lee, Mississauga (CA); David Colantonio, Mississauga (CA)

(73) Assignee: SPP Canada Aircraft, Inc., Mississauga Ontario (CA)

( * ) Notice: Subject to any disclaimer, the term of this patent is extended or adjusted under 35 U.S.C. 154(b) by 164 days.

(21) Appl. No.: 14/831,947

(22) Filed: Aug. 21, 2015

(65) Prior Publication Data

US 2016/0375991 A1 Dec. 29, 2016

(30) Foreign Application Priority Data

Jun. 26, 2015 (CA) ..................................... 2895679

(51) Int. Cl.
  *F15B 15/26* (2006.01)
  *B64C 25/26* (2006.01)
  *B64C 25/22* (2006.01)

(52) U.S. Cl.
  CPC .............. *B64C 25/26* (2013.01); *B64C 25/22* (2013.01); *F15B 15/261* (2013.01)

(58) Field of Classification Search
  CPC ....... B64C 25/26; B64C 25/22; F15B 15/261; F15B 15/26; F15B 2015/268
  USPC .......................................... 92/15, 27, 28, 24
  See application file for complete search history.

(56) References Cited

U.S. PATENT DOCUMENTS

| | | | | |
|---|---|---|---|---|
| 2,887,991 A * | 5/1959 | Driskel | ................. | F15B 15/261 92/24 |
| 3,008,454 A * | 11/1961 | Wilkins | ................ | F15B 15/261 91/169 |
| 3,107,582 A * | 10/1963 | Royster | ................ | F15B 15/261 92/164 |
| 3,180,234 A * | 4/1965 | Crawley | ................ | B64C 25/22 92/110 |
| 3,342,111 A * | 9/1967 | Royster | ................ | F15B 15/261 92/24 |
| 3,498,182 A * | 3/1970 | Selke | .................... | F15B 15/261 91/44 |
| 4,635,536 A | 1/1987 | Liu et al. | | |
| 4,703,683 A | 11/1987 | Sue | | |

(Continued)

FOREIGN PATENT DOCUMENTS

DE  3428228  * 2/1986 ............. F15B 15/26
EP  0170873 A1  2/1986

OTHER PUBLICATIONS

DE3428228 Translation.*

(Continued)

*Primary Examiner* — Thomas E Lazo
*Assistant Examiner* — Dustin T Nguyen
(74) *Attorney, Agent, or Firm* — Schwegman Lundbeeerg & Woessner, P.A.

(57) ABSTRACT

A lockable actuator has lock segments that move into recesses inside a piston to enable the piston to move. The lock segments may also move radially outwardly from the recesses in the piston to engage a bevel edge of a cylinder housing assembly to lock the piston. Lock rams having ramps force the lock segments radially outwardly into engagement with the bevel edge of the cylinder housing assembly.

8 Claims, 3 Drawing Sheets

(56) References Cited

U.S. PATENT DOCUMENTS

| | | | | |
|---|---|---|---|---|
| 5,063,828 | A | * | 11/1991 | Kamimura ............ F15B 15/261 91/23 |
| 5,184,465 | A | * | 2/1993 | Howard .................. B64C 25/22 244/102 R |
| 6,059,228 | A | | 5/2000 | Koizumi et al. |
| 6,832,540 | B2 | | 12/2004 | Hart |
| 2009/0091476 | A1 | | 4/2009 | Ataman et al. |
| 2014/0374538 | A1 | | 12/2014 | Schmidt |

OTHER PUBLICATIONS

"Canadian Application Serial No. 2,895,679, Office Action dated Jul. 7, 2016", (dated Jul. 7, 2016), 3 pgs.

"European Application Serial No. 16175193.8, Office Action dated Nov. 25, 2016", 9 pgs.

\* cited by examiner

DUAL LOCKING HYDRAULIC ACTUATOR FOR STRUCTURAL BRACE

TECHNICAL FIELD

The present invention relates generally to structural braces incorporating actuators and, in particular, to lockable braces for aircraft landing gear.

BACKGROUND

Retractable landing gear for aircraft include a main landing gear and a nose landing gear. The main landing gear may include a side brace for locking the locking gear. The nose landing gear may include a truss brace and a drag brace. Each of these structural braces may employ a lockable hydraulic actuator.

In some landing gears, the hydraulic actuator that acts as the brace may be locked and unlocked by sending an electrical signal to a switch that in turn actuates a key to lock and unlock the actuator. Such a mechanism has been deployed on the Gulfstream G-450 main landing gear. Other lockable actuator designs are disclosed in U.S. Pat. No. 6,832,540, U.S. Pat. No. 6,059,228, U.S. Pat. No. 5,063,828, U.S. Patent Application 2014/0374538 and U.S. Patent Application 2009/0091476.

An improved lockable actuator that is capable of locking in both extended and retracted positions while also providing a lightweight, simple and reliable design would be desirable for a structural brace in a landing gear.

SUMMARY

Disclosed in this specification is a dual locking hydraulic actuator for a structural brace that may be used in a landing gear or any other mechanism, system or apparatus having a hydraulic actuator. The dual locking hydraulic actuator has, in general, a cylinder housing assembly, a stack tube and a piston that slides over the stack tube along a main longitudinal axis. The actuator includes two slidable lock rams that move axially to compress a same compression spring disposed inside the actuator. Lock segments move orthogonally with respect to the main longitudinal axis from a sliding position which they are recessed in the piston and a locked position in which they engage the cylinder housing assembly.

Accordingly, one inventive aspect of the present disclosure is a method of locking a hydraulic actuator acting as a structural brace in a landing gear, the method comprising exerting hydraulic pressure to displace a piston relative to a locking ram and wherein displacement of the piston relative to the locking ram causes lock segments to move radially outwardly from recesses in the piston to engage a cylinder housing.

Another inventive aspect of the present disclosure is a method of unlocking a hydraulic actuator acting as a structural brace in a landing gear, the method comprising exerting hydraulic pressure to displace lock segments locked between a cylinder housing and a locking ram into a sliding position inside recesses in a piston to thereby unlock the actuator.

This summary is provided to highlight certain significant inventive aspects but is not intended to be an exhaustive or limiting definition of all inventive aspects of the disclosure. Other inventive aspects may be disclosed in the detailed description and drawings.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

In general, the novel actuator is mechanically lockable in either extended or retracted positions. This actuator, which may be a hydraulic actuator, may be used to provide a structural brace in the fully extended or fully retracted positions of the actuator. This actuator can be used in aerospace applications such as landing gear retraction/extension systems. For example, this lockable actuator may be used as a side brace actuator for retracting and extending a main landing gear of an aircraft. This actuator may be used in a drag brace actuator or any other type of brace actuator. Alternatively, the lockable actuator may be used for actuation of other fluidly powered systems or machines.

For the purposes of this specification, the term "inner" (or "proximal") describes features that are closer to the lug. The term "outer" (or "distal") describes features that are closer to the rod end.

Figures 1, 1A:
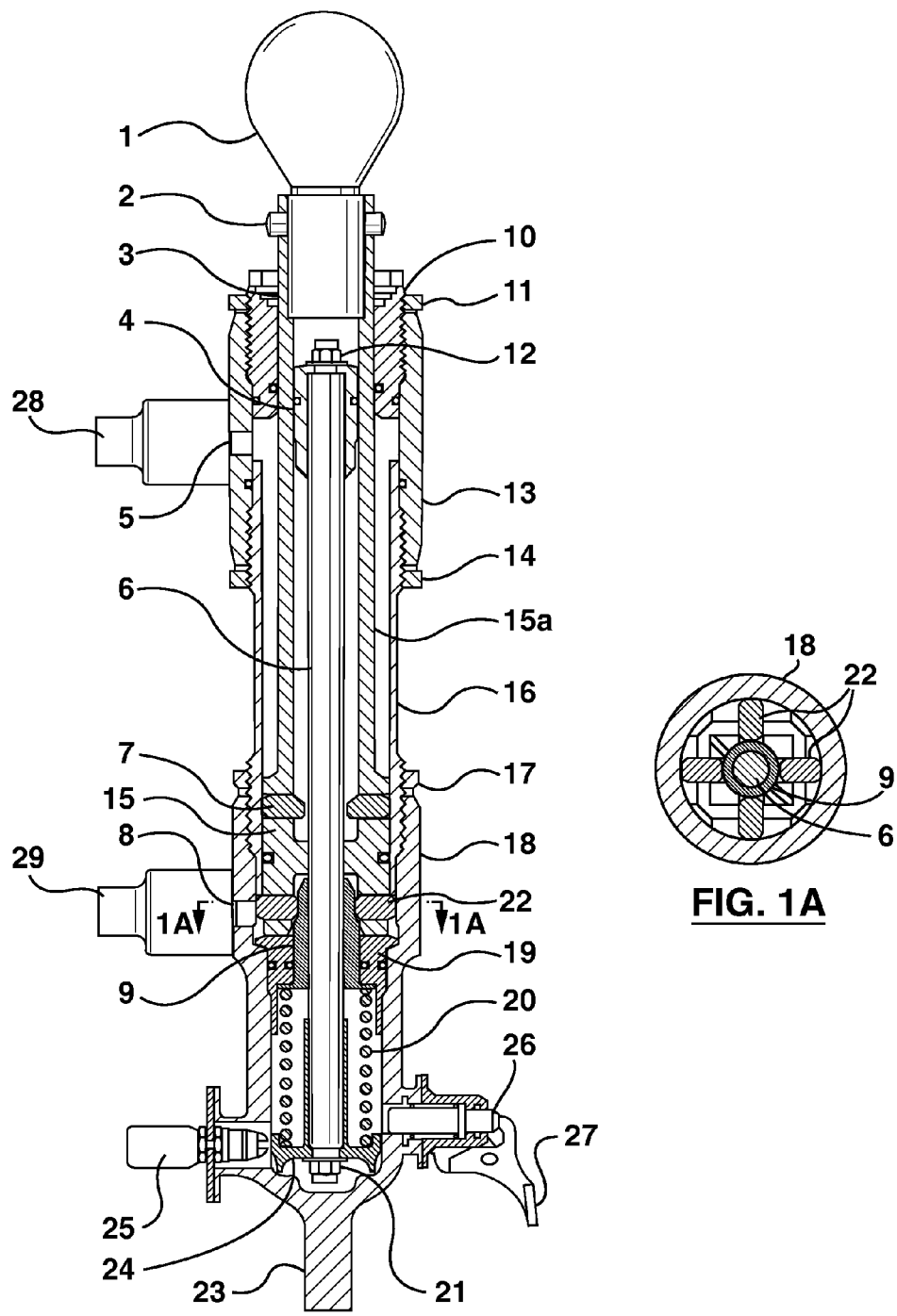
FIG. 1 is a cross-sectional view of one embodiment of the dual locking hydraulic actuator in a retracted and locked position.
FIG. 1A is a cross-sectional view taken through cross-section 1A-1A in FIG. 1.

FIG. 1 shows a hydraulic actuator arrangement in the retracted and locked position. The actuator comprises a piston 15, a piston rod 15a and a cylinder housing assembly. The cylinder housing assembly is composed of an outer barrel 13, a cylinder housing 16 and an inner barrel 18 which are structurally joined together to form the cylinder housing assembly. The locking method in the retracted position is accomplished by inner lock segments 22 which are held in place by a lock ram 9 during the retracted and locked condition. The lock ram 9 is maintained in position by a compression spring 20 which drives the inner lock segments 22 into a position against the beveled edge (or beveled interface) of the cylinder housing 16. In the retracted and locked position, the primary tension load path occurs from a rod end 1 through the piston 15 to the inner lock segments 22 which transmit loads across the beveled interface to the cylinder housing 16 and ultimately to a lug 23, thereby completing the structural load path along the actuator axis. Compression loads are reacted by a piston head of the piston 15 bottoming against a gland 19 which is structurally connected to the inner barrel 18. The locked position sensor hole 8 enables a sensing device to detect the presence of the inner lock segments 22 to indicate that the actuator is in the retracted and locked position. In the retracted position, hydraulic pressure can be maintained on the annular area of the piston 15 to provide additional locking of the actuator in addition to the mechanical lock provided by the inner lock segments 22.

In the illustrated embodiment, as depicted by way of example in FIG. 1A, there are four inner lock segments 22. However, in other embodiments, the number of inner lock segments may be varied. In other words, a greater or less number of inner lock segments operating in the same manner may be used to provide a structural lock.

In order to extend the actuator, hydraulic pressure is applied through a down port 29 near the sensor hole 8 to the areas around the inner lock segments 22. Pressuring the down port 29 causes the actuator to extend to brace the landing gear when it has deployed downward from the aircraft. As hydraulic pressure builds, the inner lock ram 9 will begin to slide in the direction of spring compression along stack tube 6, thereby enabling the inner lock segments 22 to move towards the center axis of the actuator. In other words, hydraulic pressure acts both axially and radially to displace the lock segments and piston axially and then also to displace the lock segments radially into the recesses of the piston. The terms "axially" and "radially" are defined relative to the center axis, i.e. main longitudinal axis. The stack tube is aligned with this center axis, i.e. the main longitudinal axis of the actuator. The motion of the inner lock segments 22 is caused by forcing the bevel edge of the segments against the cylinder housing 16 and the piston 15. As the lock segments drop into the fully recessed position, fluid pressure will act against the piston head enabling the outward travel of the piston 15 thus causing the actuator to extend. The piston 15 travels outwardly (i.e. distally) in response to hydraulic pressure acting upon the piston head until the actuator is fully extended.

Figure 2:
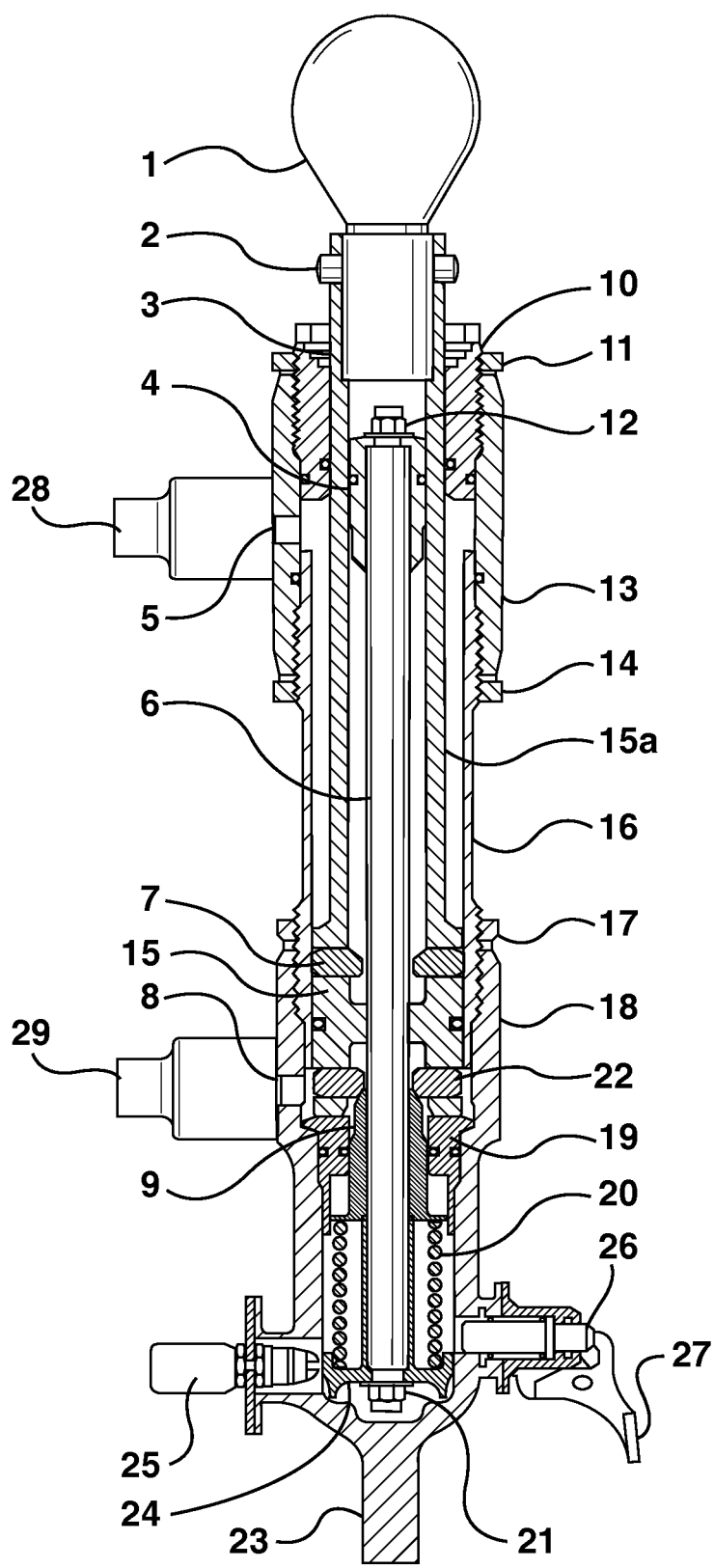
FIG. 2 is cross-sectional view of the dual locking hydraulic actuator showing a lock ram displaced along a stack tube due to hydraulic pressure which then enables inner lock segments to recess into the piston, thereby enabling actuator extension.

FIG. 2 shows the lock ram 9 displaced along the stack tube 6 due to hydraulic pressure which then enables the inner lock segments 22 to recess into the recesses of the piston thereby extending the actuator. The recesses of the piston are radial slots or channels that are shaped and dimensioned to receive the inner lock segments.

As the piston travels towards the fully extended position, the stack tube 6 and the cylinder housing assembly (which is composed of the outer barrel 13, the cylinder housing 16 and the inner barrel 18) act as a guide to axially constrain the sliding motion of the piston 15.

Figure 3:
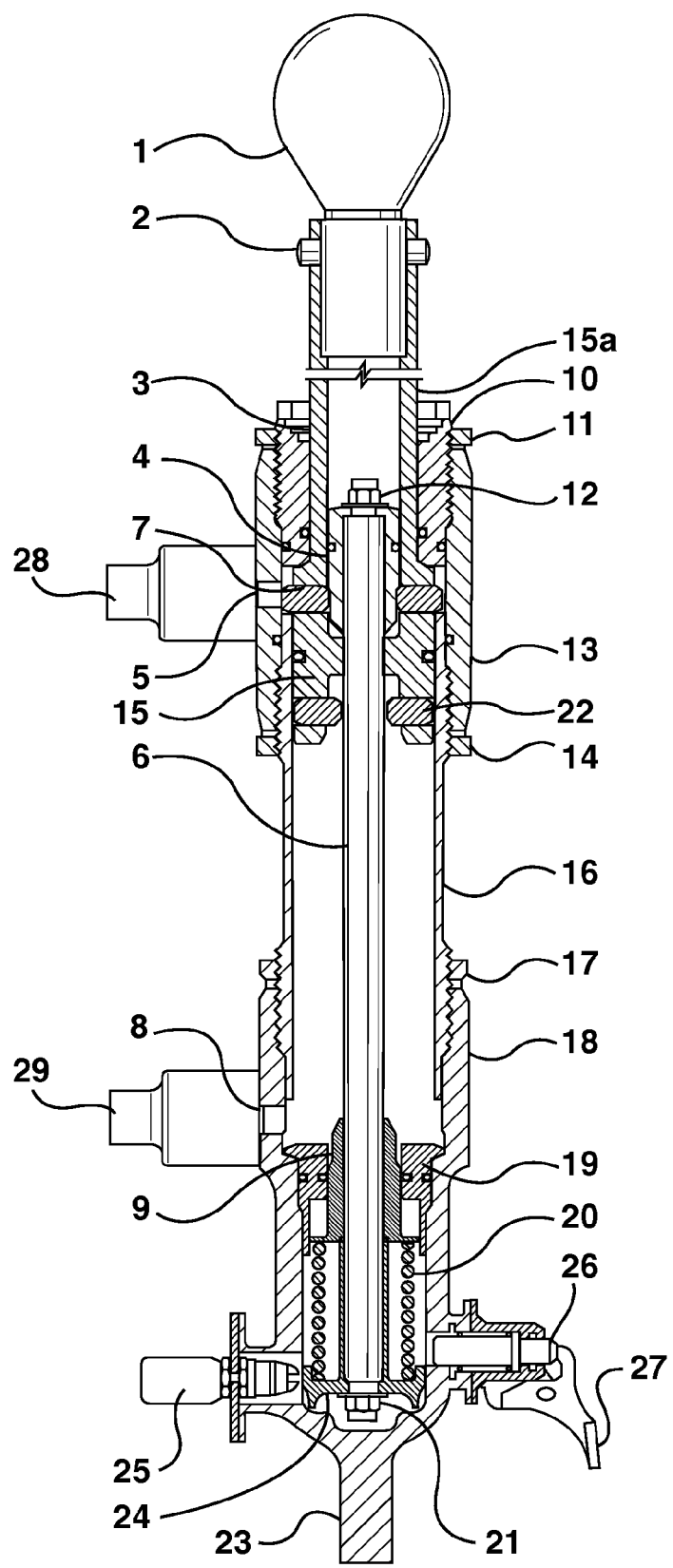
FIG. 3 is a cross-sectional view of the dual locking hydraulic actuator in an extended and locked position.

FIG. 3 shows the actuator in the extended and locked position. The locking action occurs as the piston 15 extends under hydraulic pressure. During this extending motion, the outer lock segments 7 engage the ramps of outer lock ram 4. These angled ramps apply an outward pressure on the outer lock segments 7 to cause the outer lock segments to protrude beyond the diameter of the piston 15. Once the fully extended position is reached, the annular area of the piston 15 will bottom out on gland 10. When this condition occurs and, as fluid pressure is then reduced, the outer lock segments 7 are driven outwardly by the ramps of the outer lock ram 4. This causes the outer lock segments 7 to engage the bevel edge of the cylinder housing assembly 16. In the extended and locked position, the primary compression load path of the actuator occurs from the rod end 1 to the piston 15 to the outer lock segments 7 which transmit loads across the beveled interface to the cylinder housing assembly 16 and ultimately to the lug 23 thereby completing the structural load path along the actuator axis. Tension loads are reacted by the piston head of the piston 15 bottoming against gland 10 which is structurally connected to the outer barrel 13. The locked position sensor hole 5 enables a sensing device to detect the presence of the outer lock segments 7 to indicate that the actuator is in the retracted and locked position. In the extended position, hydraulic pressure can be maintained on the bore area of the piston 15 to provide additional locking of the actuator in addition to the mechanical lock provided by the outer lock segments 7.

In the embodiment illustrated by way of example in FIGS. 1 to 3, there are four outer lock segments 7. However, the number of outer lock segments may be varied. In other words, a greater or lesser number of outer lock segments operating in the same manner may be used to provide the structural lock. A symmetrical arrangement of lock segments provides the most even distribution of locking forces to lock the piston in place.

The outer and inner lock rams 4, 9 act as driving mechanisms for the outer and inner lock segments 7, 22, respectively. The two lock rams are axially articulating along stack tube 6 which is constantly loaded by the compression spring 20. In both extension and retraction locking, the outer and inner lock rams 4, 9 are driven by the lock segments 7, 22 which cause a reaction in the compression direction of spring 20. The components for the locking rams are held together by nuts 12, 21 which fasten components 4, 9, 20, 24 along the stack tube 6. In this manner, the inner lock ram 9 is a sliding component capable of sliding along the stack tube 6. The outer lock ram 4 is secured to the stack tube 6 so that the outer lock ram 4 and stack tube 6 move upwardly together. This upward motion causes the lock piston 24 to compress the spring 20. In other words, the inner lock ram slides over the stack tube to compress the spring whereas the outer lock ram is coupled to the stack tube. The lock piston 24 acts as a housing to retain the spring 20 and provides constant load to the stack tube 6 and the inner lock ram 9. The lock piston 24 is mechanically coupled by the stack tube to the outer lock ram 4 so that when the outer lock ram moves toward the rod end, the lock piston 24 also moves in that same direction to thereby compress the spring 20. Thus, the same (single) spring 20 is compressed by axially opposite motions of the inner and outer lock rams. In other words, the spring 20 is compressed either when the outer ram moves upwardly (i.e. toward the rod end) or when the inner ram moves downwardly (i.e. toward the lug end).

Actuator retraction will occur from the down and locked position and is initiated by applying hydraulic pressure to the up port 28 located near the sensor hole 5. As the hydraulic pressure builds, the outer lock ram 4 will retract thereby causing the stack tube 6 to compress the spring 20 through the lock piston 24. Simultaneously when the lock ram 4 slides out of position, the outer lock segments 7 are forced by the bevel of the cylinder housing 16 and the piston 15 to drop into the recessed position of the piston 15 to allow the retraction motion to occur. In other words, the hydraulic pressure exerts axial and radial loads on the segments to first drive the segments axially and then drive them both axially and radially into the recesses as the piston moves away from the ramps of the lock ram.

As the actuator piston 15 reaches the fully retracted position, bottoming of the piston head of the piston 15 will occur against gland 19. As hydraulic pressure is reduced, the inner lock ram 9 will drive the inner lock segments 22 against the bevel edge of the cylinder housing 16, resulting in the mechanical lock.

Jamming fasteners 11, 14, 17 are provided to fasten (i.e. structurally lock) the components together.

A ground lock mechanism 26, 27 is used to prevent inadvertent retraction of the actuator which may cause a safety issue. A similar design may be used to prevent inadvertent extension of the actuator when in the retracted position.

An additional position sensor 25 is provided for monitoring the lock piston to confirm that the lock rams 4, 9 are fully engaged with the lock segments 7, 22.

From the foregoing, it is apparent that the lockable actuator is characterized by a cylinder housing assembly, a stack tube disposed within the cylinder housing in which the stack tube defines a longitudinal axis and a piston slidable along the stack tube in response to hydraulic pressure exerted on the piston. The piston includes recesses (or slots) into which lock segments move to disengage or unlock the actuator. The actuator includes a compression spring aligned with the axis for exerting a load on the stack tube. In the retracted position, the locking action is accomplished using an inner lock ram slidable along the stack tube and a plurality of inner lock segments movable orthogonally (i.e. radially) to the axis between (i) a locking position in which the inner lock segments engage a bevel edge of the cylinder housing assembly to lock the actuator when the actuator is retracted and (ii) a sliding position in which the inner lock segments are recessed into first recesses in the piston. Locking in the extended position is accomplished using an outer lock ram slidable along the stack tube and a plurality of outer lock segments movable orthogonally (i.e. radially) to the axis between (i) a locking position in which the outer lock segments engage an outer bevel edge of the cylinder housing assembly to lock the actuator when the actuator is extended and (ii) a sliding position in which the outer lock segments are recessed into second recesses in the piston. From the illustrations it can be seen that the inner lock ram and the outer lock ram of the illustrated embodiment have ramps angled to substantially match angled surfaces of the inner and outer lock segments, i.e. the radially inwardly facing beveled surfaces. In addition, it is noted that the lock segments have radially outwardly facing beveled surfaces in the illustrated embodiment which are designed to engage the beveled edge of the cylinder housing. This simple yet elegant design utilizes only a single compression spring. The design enables locking of the actuator in both the retracted and extended positions.

Although the lockable actuator is primarily designed as a structural brace for use in a landing gear, this lockable actuator may be used in other braces or indeed in any other suitable application, even outside of aerospace, where it is desired to lock an actuator in either the extended or retracted position. For example, this may be usable in automotive engineering, in robotics, to name only a couple potential areas of utility.

Although the embodiment described above refers to a hydraulic actuator, it will be appreciated that the inventive concepts may be applied to a pneumatic actuator. Thus, the lockable actuator disclosed herein may also be a pneumatic actuator or a hydraulic actuator. A fluid pressure (hydraulic or pneumatic) may be used to power the actuator.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including" and "containing" are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g., "such as") is intended merely to better illustrate or describe embodiments of the invention and is not intended to limit the scope of the invention unless otherwise claimed.

While one or more embodiments have been provided in the present disclosure, it should be understood that the disclosed systems and methods might be embodied in many other specific forms without departing from the scope of the present disclosure. The present disclosure is to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or connected with each other may be indirectly coupled or connected through an interface, part, device, or intermediate component whether mechanically or otherwise. Other examples of changes, substitutions, and alterations are ascertainable by one skilled in the art and could be made without departing from the scope disclosed herein.

The embodiments of the invention described above are intended to be exemplary only. As will be appreciated by those of ordinary skill in the art, to whom this specification is addressed, many obvious variations, modifications, and refinements can be made to the embodiments presented herein without departing from the inventive concept(s) disclosed herein. The scope of the exclusive right sought by the applicant(s) is therefore intended to be limited solely by the appended claims.

The invention claimed is:

1. A lockable actuator comprising:
   a cylinder housing assembly having an up port and a down port spaced longitudinally from the up port;
   a stack tube disposed within the cylinder housing, the stack tube defining a longitudinal axis and movable within the cylinder housing, wherein the stack tube extends longitudinally from the up port to the down port;
   a piston slidable along the stack tube in response to fluid pressure exerted on the piston, the piston comprising recesses;
   a single compression spring aligned with the axis for exerting a load on the stack tube;
   a slidable inner lock ram;
   a plurality of inner lock segments movable orthogonally to the axis between (i) a locking position in which the inner lock segments engage a bevel edge of the cylinder housing assembly to lock the actuator when the actuator is retracted such that the inner lock segments are aligned with the down port and (ii) a sliding position in which the inner lock segments are recessed into first recesses in the piston;
   a slidable outer lock ram secured to the stack tube and movable with the stack tube; and
   a plurality of outer lock segments movable orthogonally to the axis between (i) a locking position in which the outer lock segments engage an outer bevel edge of the cylinder housing assembly to lock the actuator when the actuator is extended such that the outer lock segments are aligned with the up port and (ii) a sliding position in which the outer lock segments are recessed into second recesses in the piston,
   wherein the inner lock ram and the outer lock ram have ramps angled to substantially match angled surfaces of the inner and outer lock segments, and wherein the single compression spring is compressed both when the outer lock ram moves toward a rod end and when the inner lock ram moves toward a lug end.

2. The actuator of claim 1 wherein the fluid pressure forces the piston inwardly against an inner gland and wherein, when the pressure is then diminished, the single compression spring forces the inner lock ram outwardly to drive the inner lock segments orthogonally against the bevel edge of the cylinder housing assembly to lock the actuator in the retracted position.

3. The actuator of claim 1 wherein the fluid pressure forces the piston outwardly against an outer gland thereby forcing the outer lock segments against the ramps of the lock ram to protrude orthogonally into engagement with the bevel edge of the cylinder housing assembly to lock the actuator in the extended position.

4. The actuator of claim 1 further comprising a locked position sensor hole aligned with the up port.

5. The actuator of claim 1 further comprising a locked position sensor hole aligned with the down port.

6. The actuator of claim 1 wherein the cylinder housing assembly comprises a cylinder housing, an inner barrel surrounding an inner portion of the cylinder portion and an outer barrel surrounding an outer portion of the cylinder housing, wherein the inner barrel comprises the inner bevel edge and the outer barrel comprises the outer bevel edge.

7. The actuator of claim 1 further comprising a lock piston acting as a housing to retain the single compression spring.

8. The actuator of claim 7 further comprising a position sensor for monitoring the lock piston to confirm that the inner and outer lock rams are fully engaged with the inner and outer lock segments.

\* \* \* \* \*